United States Patent [19]

Kamimura et al.

[11] Patent Number: 4,492,998
[45] Date of Patent: Jan. 8, 1985

[54] CASSETTE TAPE RECORDER

[75] Inventors: Testuro Kamimura; Seiichiro Matsuki, both of Saitama, Japan

[73] Assignee: Pioneer Electronic Corporation, Tokyo, Japan

[21] Appl. No.: 415,620

[22] Filed: Sep. 7, 1982

[30] Foreign Application Priority Data

Sep. 7, 1981 [JP] Japan .......................... 56-131920[U]

[51] Int. Cl.³ ............................................. G11B 23/02
[52] U.S. Cl. .................................... 360/132; 242/199; 242/68.3
[58] Field of Search ........ 360/132; 242/192, 198–204, 242/68.3

[56] References Cited

U.S. PATENT DOCUMENTS

| 3,947,883 | 3/1976 | Suzuki | 360/132 X |
| 4,191,984 | 3/1980 | Tsukidate et al. | 360/132 |
| 4,309,002 | 1/1982 | Saitou et al. | 242/198 |
| 4,436,256 | 3/1984 | Saitou | 242/200 |

Primary Examiner—John H. Wolff
Attorney, Agent, or Firm—Sughrue, Mion, Zinn, Macpeak and Seas

[57] ABSTRACT

A cassette deck includes a reel shaft on the tape supply side provided with a tapered portion for engaging a cassette reel and an elastic member supporting the reel from below which prevents the reel from striking the lower wall of the cassette case due to vibration of the deck or the like. The improvement effectively eliminates the generation of wow due to tape deck vibration.

15 Claims, 20 Drawing Figures

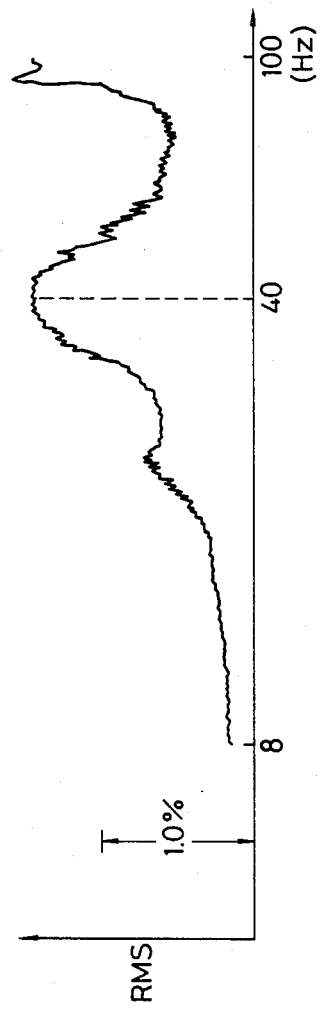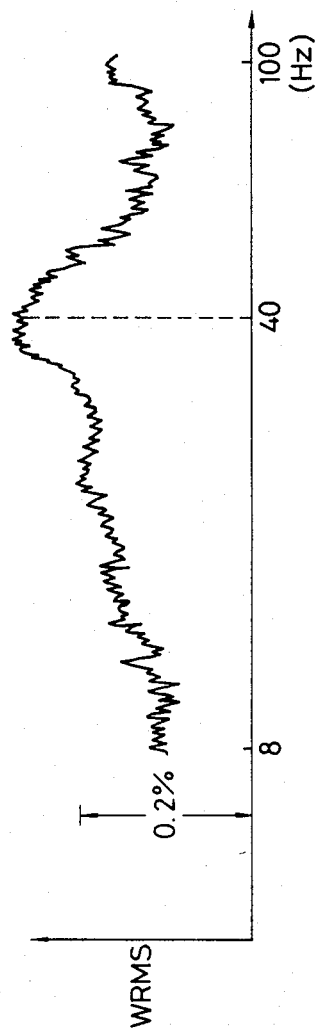

CASSETTE TAPE RECORDER

BACKGROUND OF THE INVENTION

The present invention relates to a cassette tape recorder for automatic stereo sets.

It is well known from experience that an ordinary cassette tape recorder may produce a high quality sound when a vehicle in which the cassette tape recorder is installed is in a stationary condition but that the same tape recorder may produce a poor quality sound when the vehicle is in motion and is experiencing large up-and-down vibrations. It is also known that, particularly when the remaining amount of tape to be played is large, wow is increased to thereby result in a poor quality sound production.

Various studies of this wow phenomenon have been made by the present inventors. In one experiment, an up-and-down vibration of 1G was applied to an ordinary cassette tape recorder at a changing frequency, and the resulting wow was measured. The results are shown in FIG. 1, which is a graph shoing the wow (RMS) characteristics vs. frequency. As is apparent from the characteristic curve, wow exceeding 1% was generated at a vibration of 40 Hz and also at 100 Hz or more. These characteristics were measured in another way, that is, with auditory sense compensation, and the results were as shown in FIG. 2. The wow generated at the vibration of 100 Hz or more was less than 0.2% and caused no problem, but the wow generated at about 40 Hz was still more than 0.2%, which caused the quality of sound to be degraded.

Detailed analyses of the wow at 40 Hz were then made, which can be understood with reference to the structure of a conventional tape recorder and the tape cassette and the operations thereof as will be explained in detail with reference to FIGS. 3 through 8.

Referring first to FIGS. 3 and 4, a tape cassette case generally designated by reference numeral 1 is made up of cassette halves 1a and 1b and a tape 2 encased therein. The tape 2 is fixed at either end to a pair or reels 3a and 3b by means of respective clampers 4a and 4b, so that the tape can be wound onto the reels 3a and 3b. Thus, when the winding diameter of the tape on one side is increased, the winding diameter of the tape on the other side is decreased. In the drawings, the tape is fully wound on supply reel 3b. It is a typical feature of the tape cassette that no flanges are provided on the reels 3a and 3b, to thereby decrease the distance between reels 3a and 3b, which in turn leads to a miniaturization of the overall physical cassette size. However, without flange members, the tape may be wound on the reels 3a and 3b non-uniformly in a width wise direction. In order to eliminate this defect, i.e., to prevent the tape from contacting with the inner walls of the cassette halves 1a and 1b, and in order to achieve such prevention without causing any substantial additional friction, a space is provided between the tape and each inner wall of the cassette halves 1a and 1b, and a sheet 5a or 5b, which is a so called "retainer", is interposed in this space so that the reels 3a and 3b are retained at a suitable position within the case 1.

A pair of guide rollers 6a and 6b, a pressure pad 7, and the like are encased in the case together with the tape 2 and the reels 3a and 3b. In the walls of the case 1 are formed a pair of capstan shaft insertion holes 8a and 8b, positioning pin insertion holes 9a, 9b, 9c and 9d, a pair of pinch roller insertion holes 10a, 10b, reel shaft insertion holes 11a and 11b, and a magnetic head insertion hole 12. Reference characters 3a' and 3b' denote engagement lips formed at an angular interval of 60° on the circumferential periphery of the reel 3a or 3b.

On the other hand, the cassette tape recorder comprises a pair of reel shafts 20a and 20b, a capstan shaft 21, a pinch roller 23 and a magnetic head 24. When the tape cassette 1 is mounted on the tape recorder, the reel shafts 20a and 20b are inserted through the reel shaft insertion holes 11a and 11b into the interior of the tape cassette 1 and engage the reels 3a and 3b. At the same time, the capstan shaft 21 is inserted into the capstan shaft insertion hole 8a. Then, when the tape recorder is played, the pinch roller 23 is inserted through the pinch roller insertion hole 10a into the interior of the tape cassette 1 to clamp the tape 2 against the capstan shaft 21 so that the pinch roller cooperates with the capstan shaft 21 rotating at a constant speed to move the tape 2 at a constant speed. At the same time, the magnetic head 24 is inserted through the magnetic head insertion hole 12 into the interior of the cassette case 1 to clamp the tape 2 against the pressure pad 7 to thereby reproduce the information recorded on the tape 2.

In the thus described play condition, the reel shaft 20a serves to take up the tape 2 and is driven by a drive source (not shown), whereas the reel shaft 20b serves to feed the tape 2 and is not driven by the source, but instead is adapted to apply a constant back tension to the tape 2.

The reel shaft 20b on the supply side of the conventional construction is shown in FIGS. 5 and 6, wherein the character C denotes a chassis of the cassette tape recorder, from which an upright shaft $20b_1$ extends vertically. A reel shaft member $20b_2$ having a regular hexagonal cross section is freely rotatably mounted on the upright shaft $20b_1$. A cylindrical hub $20b_3$ surrounds the shaft $20b_2$ so as to be slidable in the axial direction but to positively engage the shaft member $20b_2$ with respect to the horizontal or rotational direction. The cylindrical hub $20b_3$ is biased to move in one direction by a spring $20b_4$ interposed between the bottom surface of the hub and the facing portion of the shaft member $20b_2$. The hub $20b_3$ is held at a position shown by a retaining member $20b_5$ tightly engaged with the shaft member $20b_2$.

As described above, the shaft member $20b_2$, the cylindrical hub $20b_3$, the spring $20b_4$ and the retaining member $20b_5$ are formed as a unit which is prevented from being pulled apart from the upright shaft $20b_1$ by means of a stopping member $20b_6$ mounted on the top end of the upright shaft $20b_1$, as shown in FIG. 5. A leaf spring $20b_7$ interposed between a flanged portion of the upright shaft $20b_1$ and the shaft member $20b_2$ is provided in order to produce a constant frictional force between the reel shaft and the upright shaft $20b_1$ to thereby apply a back tension to the tape 2. With the thus constructed reel shaft 20b, when the tape cassette is inserted, if the reel lips 3b' of the cassette are not properly meshed with the outer projections $20b'_3$ of the cylindrical hub $20b_3$, the cylindrical hub $20b_3$ may be pressed downwardly so that no damage occurs. If a simpler construction is desired, as shown in FIG. 7, projections $20b'_2$ may be formed directly on the shaft member $20b_2$ with the shaft member rotatably mounted on the upright shaft $20b_1$. The leaf spring $20b_7$ provides back tension and is also provided with somewhat more bending range.

Now, when the above-described tape recorder is in the play condition, let us asseme that an up-and-down vibration is applied thereto as shown by the arrow in FIG. 4. When the frequency of vibration is very low, e.g. about 1 Hz, the reels 3a and 3b are vibrated together with the case 1 and chassis C. However, when the frequency is increased, the reels 3a and 3b may remain relatively stationary while only the case 1 vibrates vertically together with the chassis C. For this reason, the upper and lower inner walls of the case 1 collide against the reels 3a and 3b with high energy. In such a condition, the tape 2 may be elongated or shortened between the point a on the tape 2 clamped between the capstan shaft 21 and the pinch roller 23 and the point b at the winding end of the reel 3b.

It is to be noted that the tape 2 between the above described points a and b has a resonance at a resonance frequency $f_O$ which is determined according to the spring constant of the tape 2 and the inertial moment of the tape wound on the reel 3b. Now, when the value of $f_O$ is calculated with a typical back tension of 2 to 3 g, a value of $f_O = 30-40$ Hz, is derived.

When the cassette tape recorder is in its play condition, as shown in FIG. 8a, the projections 3b' of the supply reel 3b are engaged with the projections 20b'$_3$ of the reel shaft 20b so that the projections 3b' rotate with the reel shaft 20b while the supply reel is rotated in the direction of the arrow. However, when the above noted resonance is generaged, the rotation of the reel 3b may be stopped by the elongation of the tape 2 as shown in FIG. 8b. Thereafter, due to the reduction of the tape, the reel 3b is rapidly rotated to thereby rotate the reel shaft 20b with high energy and at a higher speed as shown in FIG. 8c. For this reason, a reactive force occurs whereby the shaft projections 20b'$_3$ push back on the reel projections 3b' so that, with the next elongation of the tape 2, the projections 3b' and 20b'$_3$ of both members are separated from each other as shown in FIG. 8d. Once such a state is generated, collision and reaction are alternately generated between the projections 3b' and 20b'$_3$ to thereby cause so-called jitter. As a result, the travelling speed of the tape 2 on the surface of the magnetic head 24 is changed, which causes wow to be generated at about 40 Hz.

Also, in the reel shaft according to the prior art, there would be a radial displacement between the reel and reel shaft of cassette. Therefore, the reel would not rotate coaxially with the reel shaft. This would cause a vertical fluctuation and a resonance of tape so that the reel might be moved in a radial direction of the reel shaft to produce an unstable travel of tape and to increase a wow.

SUMMARY OF THE INVENTION

It is an object of this invention to provide a cassette tape recorder which does not cause a large WRMS, even it vertical vibrations are applied thereto, and which is thus improved in tone quality.

In order to accomplish the above object, in the cassette tape recorder of the invention, at least the reel shaft on the tape supply side comprises a taper portion engaged with a reel of the cassette in such a manner that the reel is coaxial with the reel shaft, and an elastic member for supporting the reel from below through the taper portion, the elastic member having an elastic force which is substantially proportional to the weight of the maximum residual quantity of tape on the reel, whereby when vertical vibrations are applied to the cassette, the elastic member can prevent the reel from violently striking the lower wall of the cassette case to decrease the vertical motion of the reel in the cassette case, and wherein a diametrial motion of the reel is prevented by the taper portion to reduce sympathetic vibrations of the tape, with the result that the collision and reaction between the reel shaft the projections caused by the sympathetic vibrations of the tape are lessened so as to keep the WRMS low.

BRIEF DESCRIPTION OF THE DRAWINGS

FIGS. 1 and 2 are graphs showing the WRMS characteristic of a conventional cassette tape recorder before and after auditory sense correction;

FIG. 6 is a sectional view along the line VI—VI of FIG. 5;

DETAILED DESCRIPTION OF THE PREFERRED EMBODIMENTS

Figure 3:
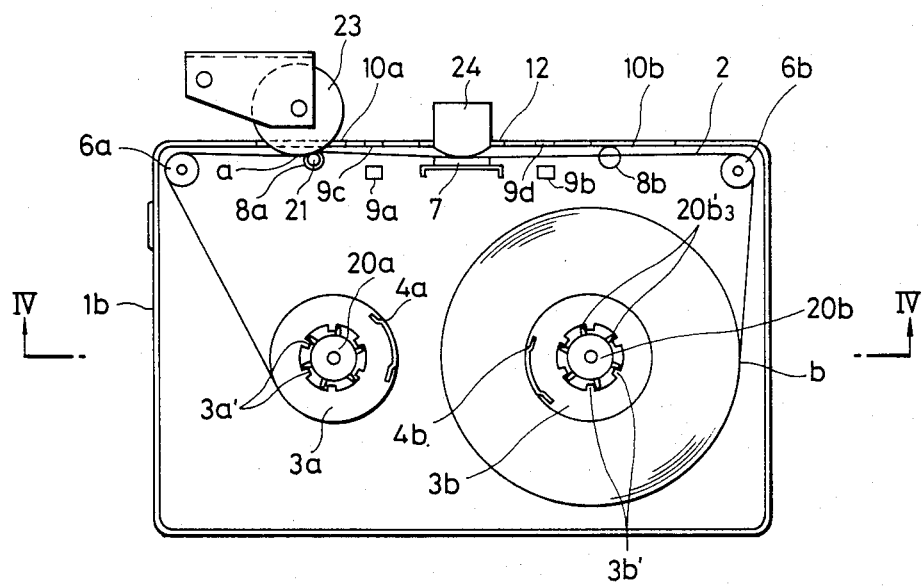
FIG. 3 is a plan view showing a cassette tape recorder in an operating condition, with one side of the cassette case detached.
Figure 4:
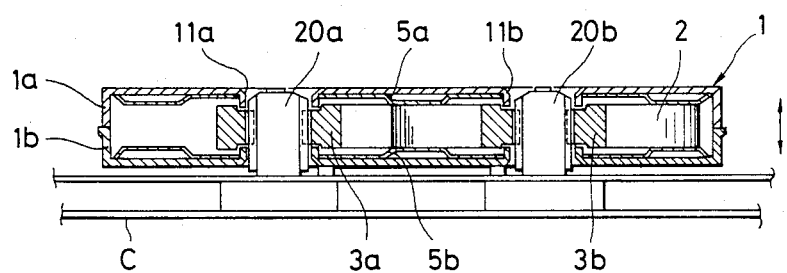
FIG. 4 is a sectional view along the line IV—IV' of FIG. 3.
Figure 5:
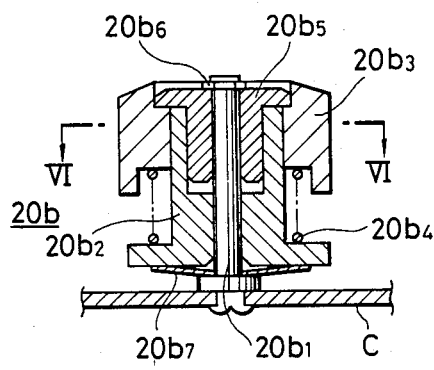
FIGS. 5 to 7 are sectional views showing a conventional reel shaft on the tape supply side, and especially
Figure 6:
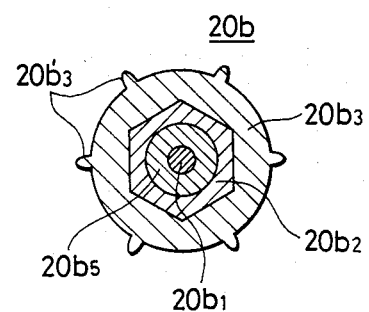
Figure 7:
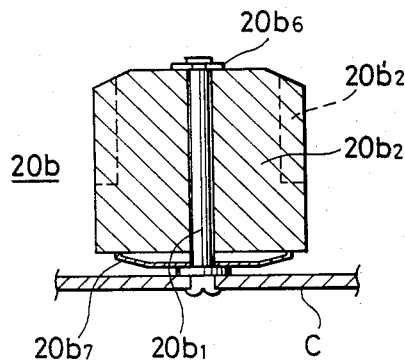

The present invention will now be described by way of embodiments shown in FIGS. 9 to 20, wherein reference characters similar to those of FIGS. 3 to 8 indicate the same or corresponding members, respectively.

FIGS. 9 to 13 show one embodiment of a reel shaft 20b on the tape supply side, in the case of a cassette tape recorder for one way use. The illustrated reel shaft 20b is structurally similar to the reel shaft of FIG. 6, except that a collar 30 having a diameter larger than that of the protrusions 20b'$_3$ is formed on the lower side of a cylindrical hub 20, the upper surface of the collar 30 being provided with a taper portion 30' at a selected angle.

Figure 12:
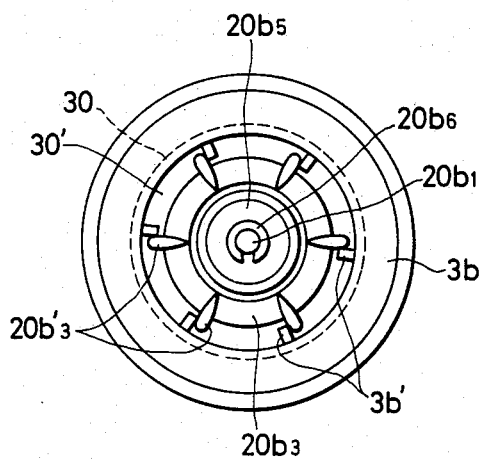
FIG. 12 is a plan view showing the condition in mounting a reel shaft on a cassette, with one portion of the reel.
Figure 10:
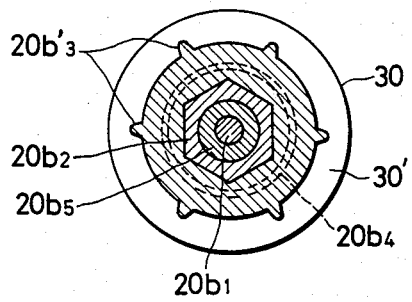
FIG. 10 is a sectional view along the line X—X of FIG. 9.
Figure 13:
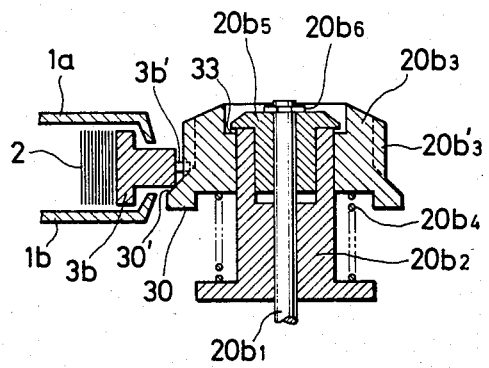
FIG. 13 is a sectional view showing the mounting condition of a cassette.
Figure 11:
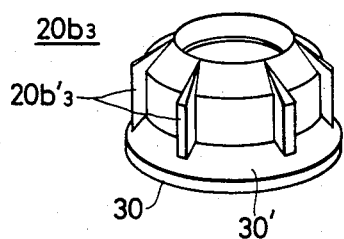
FIG. 11 is a perspective view of one portion of FIG. 9.

With the above reel shaft 20b, however, when a cassette is mounted thereon as shown in FIGS. 12 and 13, the inner peripheral lower edge of the reel 3b and the leading edge of a protrusion $3b'$ are adapted to seat on the taper portion $30'$ to support the reel $3b$ with a spring $20b_4$ through the taper portion $30'$, so that the reel $3b$ is retained at an intermediate position between the upper and lower cases $1a$, $1b$ of the cassette 1. The spring $20b_4$ is selected to have 10 to 20 g of elastic force in such a manner as to be substantially in proportion to the weight of the maximum residual quantity of tape on the reel $3b$.

Therefore, in the condition in which the cassette is mounted, as shown in FIG. 13, the upper end surface of the cylindrical hub $20b_3$ is slightly separated from a pressing member $20b_5$ so as to form a gap 33, and to position the reel $3b$ coaxially with the reel shaft $20b$.

In the above embodiment, the elastic force of the spring $20b_4$ is selected to be of a specific strength. But it is possible that a strong spring may be used for the spring $20b_4$ and in place of this spring, a leaf spring $20b_7$ may satisfy the above conditions. In this case, when the cassette 1 is installed, the whole reel shaft unit moves down so as to form a gap between a stopper $20b$ and the pressing member $20b_5$.

In either case, the reel $3b$ of the cassette 1 is supported by an elastic member comprising the spring $20b_4$ or the leaf spring $20b_7$ from below through the taper portion $30'$, so that the vertical vibrations do not cause the reel $3b$ to strike the lower inner walls of the cassette case 1, and the vertical motion of the reel $3b$ is reduced by half so as to decrease the sympathetic vibration of the tape 2. Since the reel $3b$ is engaged with the taper portion $30'$ in such a manner as to be retained coaxially with the reel shaft $20b$, even if the sympathetic vibrations occur in the tape 2, the reel $3b$ will not move, resulting in that there is almost no collision and repulsion between the protrusions $3b'$ of the reel $3b$ and 20 of the cylindrical hub $20b_3$.

Figure 8:
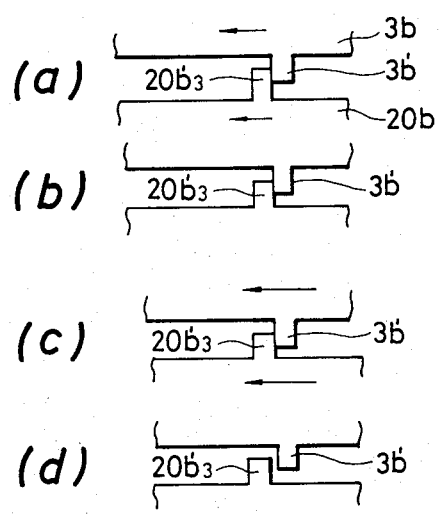
FIG. 8 is a schematic illustration of a problem caused when using the reel shafts described in FIGS. 5 to 7.

Jitter as shown in FIG. 8 will thus not occur, and the speed of the tape 2 travelling on the surface of the magnetic head 24 is kept constant, resulting in an improvement in the WRMS.

Figure 14:
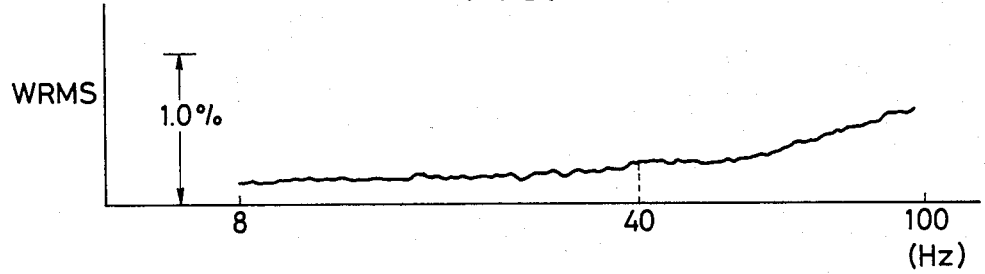
FIGS. 14 and 15 are graphs showing WRMS characteristics before and after hearing correction, respectively, measured by applying vertical vibrations to the cassette tape recorder adopting the reel shaft of FIGS. 9 to 13.
Figure 15:
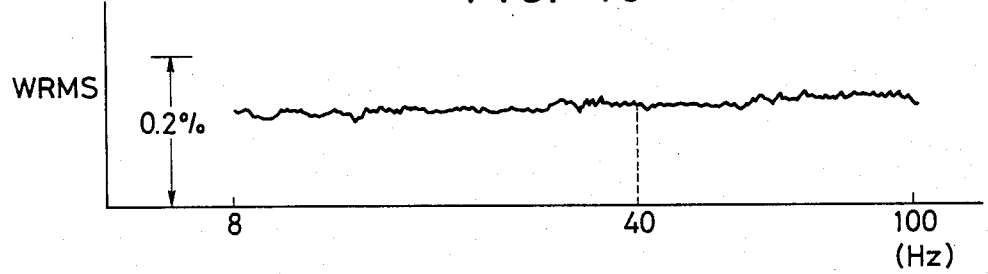

FIGS. 14 and 15 show the state of such improvement by way of WRMS characteristic graphs of measurements on the embodiment shown in FIGS. 9 to 13. Conventionally at about 40 Hz, there is 1 percent of WRMS before hearing correction and more than 0.2 percent of WRMS after hearing correction, but this invention eliminates such WRMS, so that the whole characteristic is far below 1 or 0.2 percent, respectively.

Figure 16:
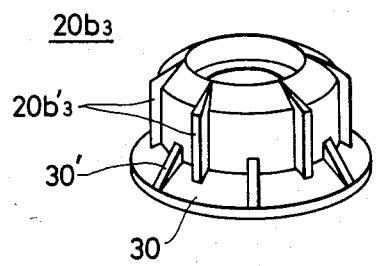
FIG. 16 is a perspective view showing a modification of one portion of FIG. 9.

FIG. 16 shows a modified form of the cylindrical hub $20b_3$ of the reel shaft $20b$ described in FIGS. 9 to 13, where the taper portion $30'$ mounted on the collar 30 of the cylindrical hub $20b_3$ takes the form of radially projecting rib, resulting in that the finger $3b'$ of the reel $3b$ does not engage the taper portion $30'$, but the inner peripheral lower edge of the reel $3b$ does engage with the taper portion $30'$, whereby the taper angle of the taper portion $30'$ can be larger. The larger the taper angle of the taper portion $30'$, the more reliably the reel $3b$ can be positioned coaxially with the reel shaft $20b$.

Figure 17:
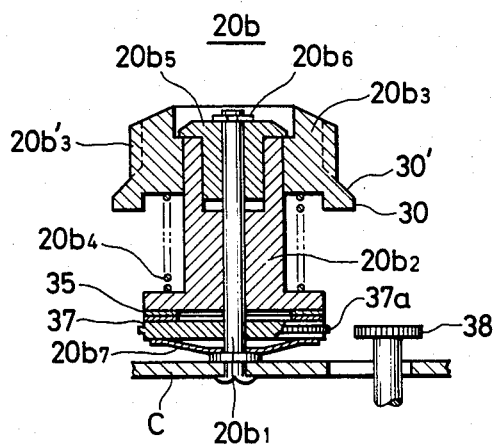
FIGS. 17 and 18 are sectional views of other embodiments corresponding to FIG. 9.
Figure 18:
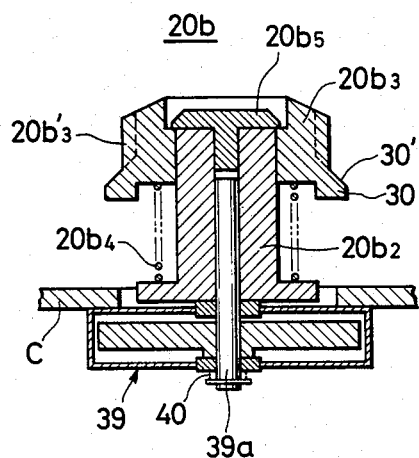

FIGS. 17 and 18 show a reel shaft $20b$ applicable to a cassette tape recorder for two-way use capable of two way play. In this case, as the reel shaft is used not only for supplying tape, but also for taking up tape, some structures for this additional function are added to the reel shaft.

In the embodiment of FIG. 17, added is a pulley 37 coupled to the shaft main body $20b_2$ through a friction mechanism comprising felt pads 35, 36 brought into pressure contact with each other by the leaf spring $20b_7$, a gear 38 rotated by a driving source (not illustrated) adapted to selectively engage a gear $37a$ mounted on the outer periphery of the pulley 37.

In the embodiment of FIG. 18, a flat motor 39 which is rotated at the time of using the reel shaft $20b$ for take-up is fixed to a chassis C, and the reel shaft unit is secured to the rotary shaft $39a$ of the motor 39. In this case, when the reel shaft $20b$ is used for supply, the motor 39 is not driven. A spring 40 mounted on the lower end of the rotary shaft $39a$ is adapted to produce friction for applying back tension to the tape 2.

Figure 9:
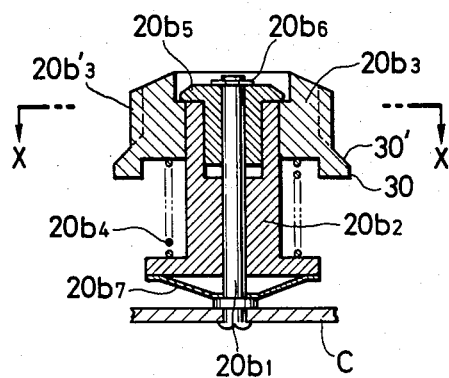
FIG. 9 is a sectional view of one embodiment of the reel shaft on the supply side used in the cassette tape recorder of the present invention.

With any of the reel shafts $20b$ described in FIGS. 9, 17 and 18, the cylindrical hub $20b$ can be slidable along the axis of the shaft main body $20b_2$.

Figure 19:
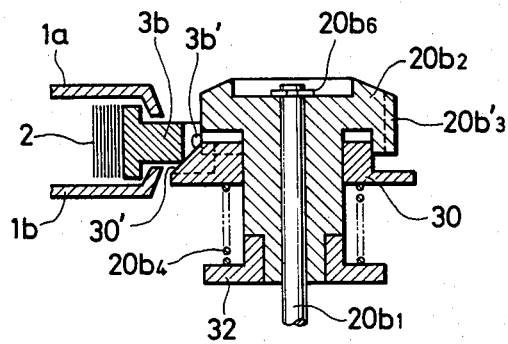
FIG. 19 is a sectional view of a further embodiment corresponding to FIG. 13.
Figure 20:
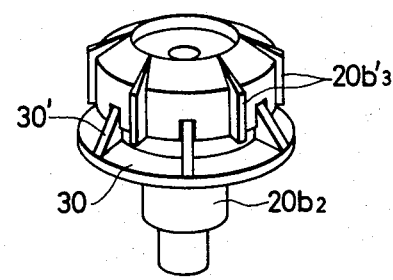
FIG. 20 is a perspective view of one portion of FIG. 19.

In the embodiments of FIGS. 19 and 20, the cylindrical hub is divided into a protrusion portion $30'$ and a collar portion 30, the protrusion portion being integral with the shaft main body $20b_2$, only the collar 30 portion being slidably fitted on the shaft main body $20b_2$ in such a manner that the collar 30 is urged upwardly by a spring $20b_4$ interposed between a flange 32 secured to the lower end of the shaft main body $20b_2$ and the collar 30. In this case, the rib-shaped taper portion $30'$ is slidably fitted in a slit formed on the shaft main body $20b_2$ so as not to rotate the collar 30 with the shaft main body $20b_2$.

As described above, this invention provides a cassette tape recorder including a pair of reel shafts having protrusions engaged with a reel of a cassette in the direction of rotation, at least the reel shaft on the tape supply side having a taper portion engaged with the reel of the cassette in such a manner that the reel is coaxial with the reel shaft, and an elastic member for supporting the reel from below via the tape portion, wherein the elastic member has an elastic force which is substantially in proportion to the weight of the maximum residual quantity of tape on the reel.

Therefore, even if vertical vibrations are applied during operation, the reel is prevented from striking the lower inner wall of the cassette case so as to lessen the vertical motion of the reel in the cassette and prevent the diametral movement of the reel in the cassette, resulting in that the sympathetic vibrations of the tape are not so large. Accordingly, even if the tape vibrates sympathetically, no collision and rebounding occurs between the reel and the protrusions of the reel shaft, so that the speed of the tape passing the magnetic head surface is kept substantially constant. Thus, a cassette tape recorder with small WRMS can be obtained, with consequent improvement in tone quality.

What is claimed is:

1. A cassette tape recorder of the type comprising at least one rotatable shaft unit for extending through an aperture in a cassette reel, said cassette reel having reel projections extending toward said shaft unit from the periphery of said aperture, said rotatable shaft unit having shaft unit projections thereon for matingly engaging said reel projections, with said shaft being adapted to be rotated by said cassette reel when said cassette reel rotates in a tape suppy direction, said shaft unit further including a tapered portion adjacent said reel having a sloping surface coaxial with a center axis of said shaft unit for supporting said cassette reel at a position coaxial with said center axis along said sloping surface, thus insuring positive centering of said cassette reel and minimizing wow.

2. A cassette tape recorder as claimed in claim 1, wherein said reel projections have radially inward ends and said tapered surface supports said cassette reel through abutment with said radially inward ends of said reel projections.

3. A cassette tape recorder as claimed in claim 1, wherein said tapered surface supports said cassette reel through abutment with said reel at said periphery of said aperture.

4. A cassette tape recorder as claimed in claim 1, wherein said reel shaft comprises a central shaft ($20b_1$), a shaft member ($20b_2$) mounted on said central shaft, and a hub ($20b_3$) slidably mounted on said shaft member, said tapered surface comprising a generally conical surface provided on said hub.

5. A cassette tape recorder as claimed in claim 4, wherein said tapered surface supports said cassette reel via abutment of said tapered surface with inner radial ends of said reel projections and with said periphery of said aperture.

6. A cassette tape recorder as claimed in claim 5, said hub being maintained slightly spaced from a stopping member atop said central shaft when supporting said fully wound cassette reel.

7. A cassette tape recorder as claimed in claim 1, wherein said reel shaft comprises a central shaft ($20b_1$), a shaft member ($20b_2$) mounted on said central shaft, and a hub ($20b_3$) slidably mounted on said shaft member, said tapered portion comprising a series of radially-extending ribs formed on said hub and having outer radial surfaces for engaging said cassette reel.

8. A cassette tape recorder as claimed in claim 1, wherein said reel shaft comprises a central shaft ($20b_1$), a shaft member ($20b_2$) mounted on said central shaft, and a hub ($20b_3$) slidably mounted on said shaft member, said hub being formed of a first portion having said shaft unit projections thereon and a collar portion slidably fitted to said shaft member below said first portion.

9. A cassette tape recorder as claimed in claim 1, further comprising an elastic member urging said tapered portion upwardly with a force substantially equal to the weight of a fully-wound cassette reel.

10. A cassette tape recorder as claimed in claim 9, said elastic member comprising a spring urging said hub upwardly with respect to said shaft member.

11. A cassette tape recorder as claimed in claim 9, said elastic member comprising a spring urging said shaft member upwardly with respect to said central shaft.

12. A cassette tape recorder as claimed in claim 11, further comprising a spring located between said hub and said shaft member for biasing said hub upwardly with respect to said spring member.

13. A device as claimed in claim 1, said cassette recorder being of the two-way play type, such that both reel shafts of said recorder comprise a reel shaft on a tape supply side.

14. A device as claimed in claim 13, including a gear mounted on said shaft member via friction means.

15. A device as claimed in claim 13, further including a motor for selectively rotating said central shaft.

* * * * *